United States Patent
Chen et al.

(10) Patent No.: US 10,572,140 B2
(45) Date of Patent: Feb. 25, 2020

(54) FOLDER MANAGEMENT USING DRAG ACTIONS AND ENLARGED ICONS

(71) Applicant: Huawei Technologies Co., Ltd., Shenzhen, Guangdong (CN)

(72) Inventors: Jian Chen, Hangzhou (CN); Jingyu Zhang, Hangzhou (CN); Qiang Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 186 days.

(21) Appl. No.: 15/443,973

(22) Filed: Feb. 27, 2017

(65) Prior Publication Data

US 2017/0249070 A1   Aug. 31, 2017

(30) Foreign Application Priority Data

Feb. 29, 2016 (CN) .......................... 2016 1 0116618

(51) Int. Cl.
*G06F 3/0486* (2013.01)
*G06F 3/0484* (2013.01)
*G06F 16/16* (2019.01)
*G06F 3/0481* (2013.01)
*G06F 3/0488* (2013.01)

(52) U.S. Cl.
CPC .......... *G06F 3/0486* (2013.01); *G06F 3/0484* (2013.01); *G06F 3/0488* (2013.01); *G06F 3/04817* (2013.01); *G06F 16/16* (2019.01)

(58) Field of Classification Search
CPC .... G06F 16/16; G06F 3/0484; G06F 3/04817; G06F 3/04845
See application file for complete search history.

(56) References Cited

U.S. PATENT DOCUMENTS

| 8,266,550 | B1* | 9/2012 | Cleron | G06F 1/1633 345/173 |
| 2003/0076322 | A1* | 4/2003 | Ouzts | G06F 3/0481 345/440 |
| 2006/0161868 | A1* | 7/2006 | Van Dok | G06F 3/0481 715/835 |
| 2007/0061745 | A1* | 3/2007 | Anthony | G06F 3/0481 715/764 |

(Continued)

FOREIGN PATENT DOCUMENTS

| CN | 102609170 A | 7/2012 |
| CN | 102890605 A | 1/2013 |

(Continued)

*Primary Examiner* — Asher D Kells
(74) *Attorney, Agent, or Firm* — Maier & Maier, PLLC

(57) ABSTRACT

The present invention discloses a folder management method and device. The method comprises: displaying a folder icon on the touchscreen display, and displaying a drag mark in a first position of the folder icon; detecting a first drag operation to the drag mark, where the first drag operation is used to increase a size of an icon of an application in a folder; and when the first drag operation is detected, displaying, on the touchscreen display, an icon that is of at least one application in at least two applications and that is inside the folder icon, wherein the icon is enlarged for display. In this way, icons, of some applications, in the folder icon can be enlarged for display, which facilitates management of applications in the folder.

20 Claims, 7 Drawing Sheets

(56) References Cited

U.S. PATENT DOCUMENTS

| | | | | |
|---|---|---|---|---|
| 2010/0257059 | A1* | 10/2010 | Fujioka | G06F 3/048 705/14.66 |
| 2011/0252346 | A1* | 10/2011 | Chaudhri | G06F 3/04817 715/765 |
| 2011/0252372 | A1* | 10/2011 | Chaudhri | G06F 3/04817 715/835 |
| 2011/0296328 | A1* | 12/2011 | Jikeya | G06F 3/04817 715/769 |
| 2012/0030623 | A1* | 2/2012 | Hoellwarth | G06F 3/04817 715/811 |
| 2012/0084732 | A1* | 4/2012 | Filippov | G06F 3/0482 715/838 |
| 2012/0192110 | A1* | 7/2012 | Wu | G06F 3/04817 715/815 |
| 2013/0024794 | A1 | 1/2013 | Ha et al. | |
| 2013/0239059 | A1* | 9/2013 | Chen | G06F 3/0488 715/835 |
| 2013/0332886 | A1* | 12/2013 | Cranfill | G06F 3/0482 715/835 |
| 2014/0096083 | A1* | 4/2014 | Kim | G06F 3/04842 715/835 |
| 2014/0149908 | A1* | 5/2014 | Jeon | G06F 3/04886 715/769 |
| 2014/0165006 | A1* | 6/2014 | Chaudhri | G06F 3/04817 715/835 |
| 2014/0380232 | A1* | 12/2014 | Sarnoff | G06F 3/04817 715/781 |
| 2015/0074576 | A1* | 3/2015 | Ma | G06F 3/0486 715/769 |
| 2015/0212702 | A1* | 7/2015 | Kim | G06F 3/04842 715/838 |
| 2015/0331594 | A1 | 11/2015 | Terada et al. | |
| 2016/0313893 | A1* | 10/2016 | Xu | G06F 3/0481 |
| 2017/0031581 | A1* | 2/2017 | Chilmulwar | G06F 3/04817 |
| 2017/0038946 | A1* | 2/2017 | Deng | G06F 3/04817 |
| 2017/0039168 | A1* | 2/2017 | Hassan | G06F 17/212 |
| 2017/0046024 | A1* | 2/2017 | Dascola | H04M 1/72522 |
| 2017/0147184 | A1* | 5/2017 | Zhang | G06F 3/04845 |

FOREIGN PATENT DOCUMENTS

| | | |
|---|---|---|
| CN | 102981713 A | 3/2013 |
| CN | 104423789 A | 3/2015 |
| CN | 105094592 A | 11/2015 |
| JP | 2005004419 A | 1/2005 |

* cited by examiner

FOLDER MANAGEMENT USING DRAG ACTIONS AND ENLARGED ICONS

CROSS-REFERENCE TO RELATED APPLICATION

This application claims priority to Chinese Patent Application No. 201610116618.3, filed on Feb. 29, 2016, which is hereby incorporated by reference in its entirety.

TECHNICAL FIELD

Embodiments of the present invention relate to the field of intelligent terminals, and in particular, to a folder management method and device.

BACKGROUND

On a mobile intelligent terminal with a touchscreen, a folder (also referred to as an object collection) on a desktop combines multiple applications into one independent folder, and becomes an independent icon. After the folder is tapped again, the mobile intelligent terminal unfolds the folder and displays an icon of each application in the folder, and then a user searches for an application required by the user in the folder. Currently, a mainstream effect of unfolding a folder can greatly help a user classify and organize desktop applications. However, in the classified applications, the user expects to preferentially use some applications in the folder, but display of applications in the folder in the prior art cannot reflect a use preference of the user, which deteriorates user experience.

SUMMARY

Embodiments of the present invention provide a folder management method and device, so as to resolve an existing problem that applications in a folder are all displayed in a same size, which is adverse to management of the applications in the folder.

Specific technical solutions provided in the embodiments of the present invention are as follows:

According to a first aspect, an embodiment of the present invention provides a folder management method, where the method is executed by an electronic device that has a touchscreen display, and the method comprises:

displaying a folder icon on the touchscreen display, and displaying a drag mark in a first position of the folder icon on the touchscreen display, where the folder icon comprises icons of at least two applications;

detecting a first drag operation to the drag mark, where the first drag operation is used to increase a size of an icon of an application in a folder; and when the first drag operation is detected, displaying, on the touchscreen display, an icon that is of at least one application in the at least two applications and that is inside the folder icon, wherein the icon is enlarged for display.

In a possible design, the first drag operation to the drag mark comprises an operation of dragging the drag mark, and the detecting a first drag operation to the drag mark comprises:

detecting whether a drag direction indicated by the first drag operation points to an exterior of the folder icon.

In a possible design, the first position is in a boundary position of the folder icon.

In a possible design, the method further comprises:

when the first drag operation is detected, displaying an icon of an application other than the at least one application in the at least two applications, where the icon is not enlarged for display.

In a possible design, after the displaying, on the touchscreen display, an icon that is of at least one application in the at least two applications and that is inside the folder icon, wherein the icon is enlarged for display, the method further comprises:

setting a status of the at least one application to an enabled state, and when the status of the at least one application is the enabled state and a tap operation to an icon of any one application in the at least one application is detected, loading the any one application.

In this design, for an application corresponding to an icon of the application that is enlarged for display, when a user needs to enable the application, the user only needs to tap the icon of the application once to directly enable the application. A folder icon in which the application is located does not need to be additionally tapped and opened, which can save time and work, and improve operation efficiency of the application.

In a possible design, after the displaying, on the touchscreen display, an icon that is of at least one application in the at least two applications and that is inside the folder icon, wherein the icon is enlarged for display, the method further comprises:

detecting a second drag operation to the drag mark, where the second drag operation is an operation used to reduce a size of an icon that is of an application and that is inside the folder icon; and when the second drag operation is detected, displaying, on the touchscreen display, a shrunk icon that is of an application in the at least one application and that is inside the folder icon, where a size obtained after the shrunk icon of the application is shrunk is the same as a size obtained before the shrunk icon of the application is enlarged.

In this design, for an icon of the application that is enlarged for display, the icon of the application that is enlarged for display may be shrunk into a size before the enlargement according to an application use need of a user, and a display size of the icon of the application in a folder icon may be changed in time, which further optimizes folder management.

In a possible design, after the displaying, on the touchscreen display, a shrunk icon that is of an application in the at least one application and that is inside the folder icon, the method further comprises:

setting a status of the shrunk application to an disabled state, and when the status of the shrunk application is the disabled state and a tap operation to the shrunk icon of the application is detected, skipping loading any one application.

In a possible design, the second drag operation to the drag mark comprises an operation of dragging the drag mark, and the detecting a second drag operation to the drag mark comprises:

detecting whether a drag direction indicated by the second drag operation points to an interior of the folder icon.

In a possible design, the method further comprises:

when an icon of any one application is enlarged for display, accordingly enlarging the folder icon for display.

In a possible design, the method further comprises:

when an icon of any one application is enlarged for display, keeping a size of the folder icon unchanged.

According to a second aspect, an embodiment of the present invention provides a folder management apparatus, where the apparatus is applied to an electronic device that has a touchscreen display, and the apparatus comprises:

a display unit, configured to display a folder icon on the touchscreen display, and display a drag mark in a first position of the folder icon on the touchscreen display, where the folder icon comprises icons of at least two applications; and a processing unit, configured to detect a first drag operation to the drag mark, where the first drag operation is used to increase a size of an icon of an application in a folder; and when the first drag operation is detected, display, on the touchscreen display, an icon that is of at least one application in the at least two applications and that is inside the folder icon, wherein the icon is enlarged for display.

In a possible design, the first drag operation to the drag mark comprises an operation of dragging the drag mark, and when detecting the first drag operation to the drag mark, the processing unit is configured to:

detect whether a drag direction indicated by the first drag operation points to an exterior of the folder icon.

In a possible design, the first position is in a boundary position of the folder icon.

In a possible design, the processing unit is further configured to:

when the first drag operation is detected, display, on the touchscreen display, an icon of an application other than the at least one application in the at least two applications, where the icon is not enlarged for display.

In a possible design, after the icon that is of at least one application in the at least two applications and that is inside the folder icon is displayed on the touchscreen display, wherein the icon is enlarged for display, the processing unit is further configured to:

set a status of the at least one application to an enabled state, and when the status of the at least one application is the enabled state and a tap operation to an icon of any one application in the at least one application is detected, load the any one application.

In this design, for an application corresponding to an icon of the application that is enlarged for display, when a user needs to enable the application, the user only needs to tap the icon of the application once to directly enable the application. A folder icon in which the application is located does not need to be additionally tapped and opened, which can save time and work, and improve operation efficiency of the application.

In a possible design, after the icon that is of at least one application in the at least two applications and that is inside the folder icon is displayed on the touchscreen display, wherein the icon is enlarged for display, the processing unit is further configured to:

detect a second drag operation to the drag mark, where the second drag operation is an operation used to reduce a size of an icon that is of an application and that is inside the folder icon; and when the second drag operation is detected, display, on the touchscreen display, a shrunk icon that is of an application in the at least one application and that is inside the folder icon, where a size obtained after the shrunk icon of the application is shrunk is the same as a size obtained before the shrunk icon of the application is enlarged.

In this design, for an icon of the application that is enlarged for display, the icon of the application that is enlarged for display may be shrunk into a size before the enlargement according to an application use need of a user, and a display size of the icon of the application in a folder icon may be changed in time, which further optimizes folder management.

In a possible design, after the shrunk icon that is of the application in the at least one application and that is inside the folder icon is shrunk on the touchscreen display, the processing unit is further configured to:

set a status of the shrunk application to an disabled state, and when the status of the shrunk application is the disabled state and a tap operation to the shrunk icon of the application is detected, skip loading any one application.

In a possible design, when the second drag operation to the drag mark comprises an operation of dragging the drag mark, and when detecting the second drag operation to the drag mark, the processing unit is configured to:

detect whether a drag direction indicated by the second drag operation points to an interior of the folder icon.

In a possible design, the processing unit is further configured to:

when an icon of any one application is enlarged for display, accordingly enlarge the folder icon on the touchscreen display for display.

In a possible design, the processing unit is further configured to:

when an icon of any one application is enlarged for display, keep a size of the folder icon unchanged on the touchscreen display.

According to a third aspect, an embodiment of the present invention provides an electronic device, and the electronic device has a function of implementing a behavior of the electronic device in the foregoing method design. The function may be implemented by using hardware, and may also be implemented by hardware by executing corresponding software. The hardware or the software comprises one or more modules corresponding to the foregoing function. The module may be software and/or hardware.

In a possible design, a structure of the electronic device comprises a touchscreen display, a memory and a processor, and the memory stores a program instruction. The processor controls the electronic device to: according to the program instruction stored in the memory, display a folder icon on the touchscreen display, display a drag mark in a first position of the folder icon on the touchscreen display, detect a first drag operation to the drag mark, and when the first drag operation is detected, display, on the touchscreen display, an icon that is of at least one application in the at least two applications and that is inside the folder icon, wherein the icon is enlarged for display.

According to a fourth aspect, an embodiment of the present invention provides a computer storage medium, which is used to store a computer software instruction used by the foregoing electronic device, and the computer storage medium comprises a program designed for executing the foregoing aspect.

The embodiments of the present invention provide a new folder management solution. Compared with the prior art, in the new folder management solution, some applications in a folder may be enlarged for display, which reflects an application selection preference of a user, thereby facilitating management of applications in the folder, and providing a vivid and interesting effect of displaying a folder icon.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The following describes the embodiments of the present invention in detail with reference to the accompanying drawings.

Figure 1:
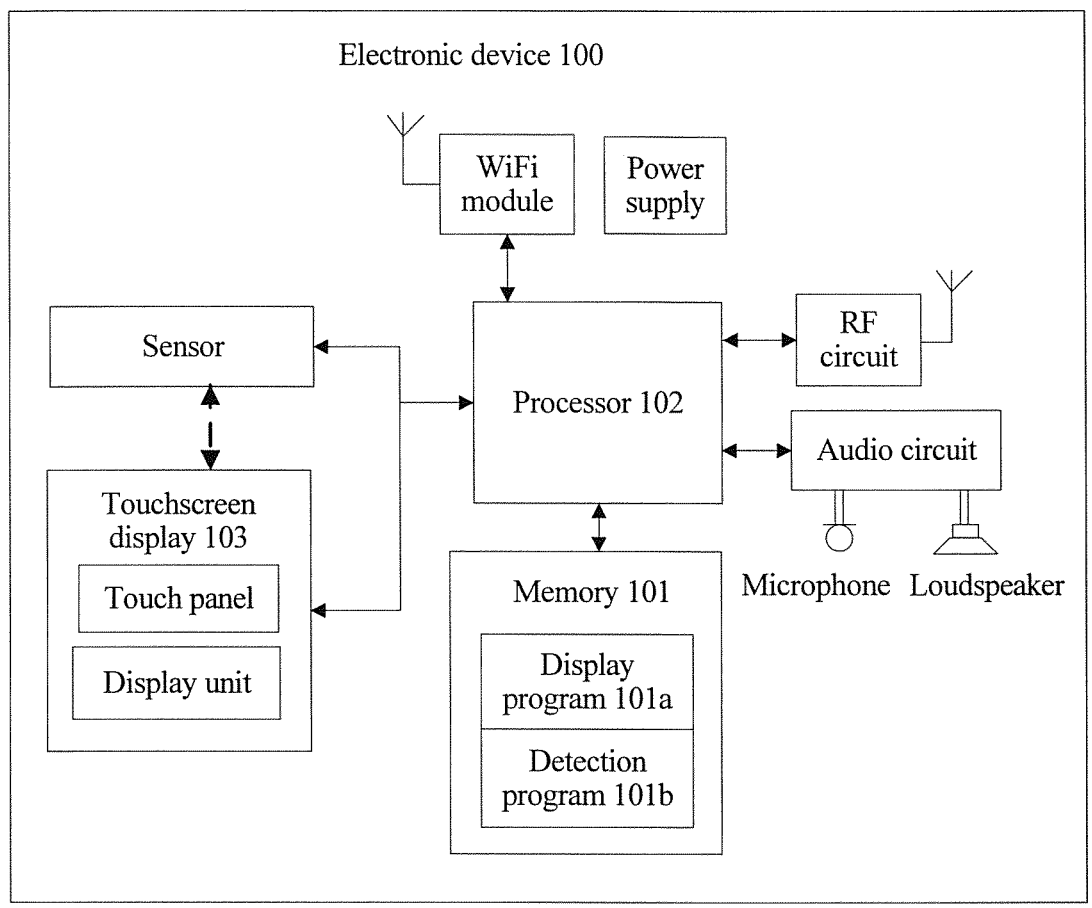
FIG. 1 is a schematic diagram of an internal structure of an electronic device according to an embodiment of the present invention.

FIG. 1 shows an internal structure of an electronic device 100 provided in an embodiment of the present invention. The electronic device 100 may comprise a mobile phone, a tablet, a personal digital assistant (FDA), a point of sales (POS), a vehicle-mounted computer, a desktop computer, a notebook, a server, and the like.

As shown in FIG. 1, an interior of the electronic device 100 may comprise: a processor 102, a memory 101 and a touchscreen display 103 that are separately connected to the processor 102, and optionally, the electronic device 100 may further comprise external devices, such as a loudspeaker, and a microphone. When communicating with the outside in a wireless manner, the electronic device 100 may further comprise a radio frequency (RF) circuit and a connected antenna, a Wireless Fidelity (WiFi) module and a connected antenna, and the like. In addition, the electronic device 100 further comprises a power supply that supplies power to the electronic device 100.

A person skilled in the art may understand that the internal structure of the electronic device shown in FIG. 1 does not constitute a limitation on an electronic device, and may comprise parts more or less than those shown in FIG. 1, or combine some parts or different part arrangements.

The following specifically describes each constituent part of the electronic device 100 with reference to FIG. 1.

The memory 101 may be configured to store a program and data. By running the program stored in the memory 101, the processor 102 executes various functional applications of the electronic device 100 and performs data processing.

The memory 101 may mainly comprise a program storage area and a data storage area. The program storage area may store an operating system (such as an Android operating system, "Android system" for short, or an iOS operating system, "iOS system" for short; the operating system may also be referred to as "system" for short), an application program (such as a sound playing function or an image playing function) that may be required by at least one function, and the like. The data storage area may store data (such as audio data and a phone book) created according to use of the electronic device 100, and the like.

By running the operating system stored in the memory 101, the processor 102 invokes an application program and completes a function provided by the application program.

In this embodiment of the present invention, the operating system in the electronic device 100 invokes a display program 101a and a detection program 101b that are stored in the memory 101 to control the touchscreen display 103, so as to complete a folder management process provided in this embodiment of the present invention.

In addition, the memory 101 may comprise a high-speed random access memory, and may further comprise a non-transitory memory, such as at least one disk storage device, a flash memory device, or another transitory solid state storage device.

The program storage area in the memory 101 may store: the display program 101a, the detection program 101b, and the like.

The display program 101a is configured to display an icon of an application or a folder icon, and a drag mark in an edge position of the folder icon on the touchscreen display 103.

The detection program 101b is configured to detect a drag operation type to the drag mark that is inserted in a first position of the folder icon displayed on the touchscreen display 103, and set display manners, of the folder icon, corresponding to different drag operation types.

The processor 102 runs the detection program 101b, controls to enable an icon enlargement function for an icon that is of at least one application and that is inside the folder icon, invokes the display program 101a stored in the memory 101, and displays, on the touchscreen display 103, the icon that is of the at least one application and that is inside the folder icon, wherein the icon is enlarged for display, so as to complete the folder management process.

Optionally, when detecting a first drag operation to the drag mark, the processor 102 is configured to:

detect whether a drag direction indicated by the first drag operation points to an exterior of the folder icon.

Optionally, the first position is in a boundary position of the folder icon.

Optionally, the processor 102 is further configured to:

when the first drag operation is detected, display, on the touchscreen display, an icon of an application other than the at least one application in the at least two applications, where the icon is not enlarged for display.

Optionally, after the icon that is of at least one application in the at least two applications and that is inside the folder icon is displayed on the touchscreen display 103, wherein the icon is enlarged for display, the processor 102 is further configured to:

set a status of the at least one application to an enabled state, and when the status of the at least one application is the enabled state and a tap operation to an icon of any one application in the at least one application is detected, load the any one application.

Optionally, after the icon that is of at least one application in the at least two applications and that is inside the folder icon is enlarged on the touchscreen display 103, wherein the icon is enlarged for display, the processor 102 is further configured to:

detect a second drag operation to the drag mark, where the second drag operation is an operation used to reduce a size of an icon that is of an application and that is inside the folder icon; and when the second drag operation is detected, display, on the touchscreen display 103, a shrunk icon that is of an application in the at least one application and that is inside the folder icon, where a size obtained after the shrunk icon of the application is shrunk is the same as a size obtained before the shrunk icon of the application is enlarged.

Optionally, after the shrunk icon that is of the application in the at least one application and that is inside the folder icon is shrunk on the touchscreen display 103, the processor 102 is further configured to:

set a status of the shrunk application to an disabled state, and when the status of the shrunk application is the disabled state and a tap operation to the shrunk icon of the application is detected, skip loading any one application.

Optionally, when the second drag operation to the drag mark comprises an operation of dragging the drag mark, and when detecting the second drag operation to the drag mark, the processor 102 is configured to:

detect whether a drag direction indicated by the second drag operation points to an interior of the folder icon.

Optionally, the processor 102 is further configured to:

when an icon of any one application is enlarged for display, accordingly enlarge the folder icon on the touchscreen display 103 for display.

Optionally, the processor 102 is further configured to:

when an icon of any one application is enlarged for display, keep a size of the folder icon unchanged on the touchscreen display 103.

In this embodiment of the present invention, the touchscreen display 103 may comprise a touch panel, a display unit, and the like.

The touch panel, also referred to as a touchscreen, may collect a touch operation (such as an operation performed by a user on the touch panel or near the touch panel by using any proper object or accessory, such as a finger or a stylus) of the user on or near the touch panel, and drives a corresponding connection apparatus according to a preset program.

Optionally, the touch panel may comprise two parts: a touch detection apparatus and a touch controller.

The touch detection apparatus detects a touch orientation of the user, and detects a signal brought by the touch operation, and sends the signal to the touch controller. The touch controller receives touch information from the touch detection apparatus, and converts the touch information into contact coordinates, then sends the touch coordinates to the processor 102, and can receive and execute a command sent by the processor 102.

In addition, the touch panel may be implemented in multiple types, such as a resistive type, a capacitive type, infrared, and a surface acoustic wave.

The display unit may be configured to display information inputted by the user or information provided for the user, and various menus of the electronic device 100. Optionally, the display unit may be configured in a form, such as a liquid crystal display (LCD) and an organic light-emitting diode (OLED). Further, the touch panel may cover the display unit. When detecting the touch operation on or near the touch panel, the touch panel sends the information of the touch operation to the processor 102 to determine a type of a touch event, and then the processor 102 provides corresponding visual output on the display unit according to the type of the touch event.

As shown in FIG. 1, the touch panel and the display unit may be integrated into the touchscreen display 103, which is configured to implement input and output functions of the electronic device 100, or the touch panel and the display unit may serve as two independent parts to separately implement the input and output functions of the electronic device 100, which is not limited in this embodiment of the present invention.

The RF circuit may be configured to: receive and send a signal in an information receiving or sending process or a call process, and in particular, after receiving downlink information sent by a base station, send the downlink information to the processor 102 for processing; and in addition, send uplink data to the base station.

Generally, the RF circuit comprises but is not limited to an antenna, at least one amplifier, a transceiver, a coupler, a low noise amplifier (LNA), a duplexer, and the like.

In addition, the RF circuit may further communicate with a network and another device by means of radio communications.

The radio communications may use any one communications standard or protocol, which comprises but is not limited to:

Global System for Mobile Communications (GSM), general packet radio service (CPRS), Code Division Multiple Access (CDMA), Wideband Code Division Multiple Access (WCDMA), Long Term Evolution ((LTE), an email, a short message service (SMS), and the like.

In FIG. 1, an audio circuit, the loudspeaker, and the microphone may provide an audio interface between the user and the electronic device 100.

The audio circuit may transmit an electrical signal obtained by converting received audio data to the loudspeaker, and the loudspeaker converts the electrical signal into a sound signal for output. In another aspect, the microphone converts a collected sound signal into an electrical signal, so that the audio circuit receives the electrical signal and converts the electrical signal into audio data, and outputs the audio data to the RF circuit, to send to another electronic device, for example, a mobile phone, or outputs the audio data to the memory 101 for further processing.

WiFi belongs to a short-range wireless transmission technology. The electronic device 100 may help, by using a WiFi module, the user receive and send emails, browse a web page, access streaming media, and the like. The WiFi module provides the user with wireless broadband Internet access.

Although FIG. 1 shows the WiFi module, it may be understood that the WiFi module is not a mandatory component of the electronic device 100, and may be omitted according to a requirement, without changing the essence scope of this embodiment of present invention.

The processor 102 is a control center of the electronic device 100, and is connected to each part of the entire mobile phone by using various interfaces and lines, and executes various functions of the electronic device 100 and processes data by running or executing a program (or referred to as a "module") stored in the memory 101 and invoking data stored in the memory 101, thereby performing overall monitoring on the electronic device 100.

Optionally, the processor 102 may comprise at least one processing unit. Optionally, the processor 102 may integrate an application processor and a modem processor. The application processor mainly processes an operating system, a user interface, an application program, and the like, and the modem processor mainly processes the radio communications. It may be understood that the modem processor may also be not integrated into the processor 102.

The electronic device 100 further comprises the power supply (such as a battery) that supplies power to each part. Optionally, the power supply may be logically connected to the processor 102 by using a power management system, so as to manage functions, such as charging, discharging, and power consumption by using the power management system.

Although not shown in FIG. 1, the electronic device 100 may further comprise a sensor (such as a light sensor, or a motion sensor).

Specifically, the light sensor may comprise an ambient light sensor and a proximity sensor.

The ambient light sensor may adjust luminance of the display unit according to brightness and darkness of ambient light, and the proximity sensor may disable the display unit and/or backlight when the electronic device 100 moves near an ear.

As a motion sensor, an accelerometer sensor may detect a value of acceleration in each direction (generally, three axes), may detect a value and a direction of gravity in a static state, and may be used to identify an application of a mobile phone posture (such as a switch between a landscape and a portrait, related games, and magnetometer posture calibration), a function related to vibration identification (such as a pedometer and a stroke), and the like.

Other sensors, such as a gyroscope, a barometer, a hygrometer, a thermometer, an infrared sensor may be further configured in the electronic device 100, and details are not described herein.

In addition, the electronic device 100 may further comprise a camera, a Bluetooth module, and the like, and details are not described herein.

The following describes a method provided in an embodiment of the present invention.

Figure 2:
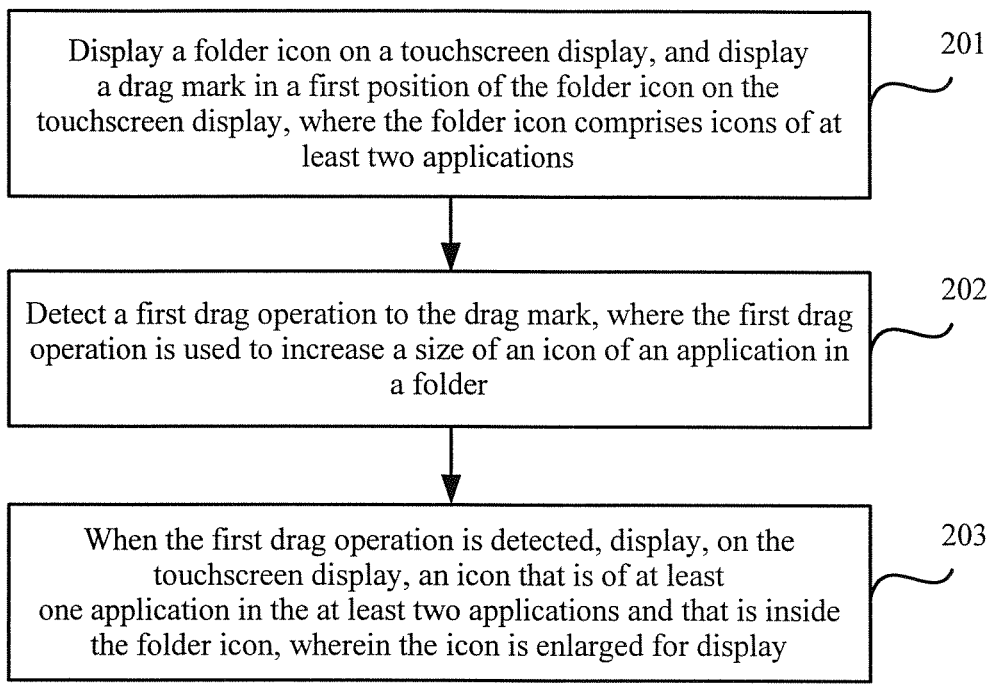
FIG. 2 is a flowchart of a folder management method according to an embodiment of the present invention.

Referring to FIG. 2, an embodiment of the present invention provides a folder management method. The method may be executed by the foregoing electronic device 100, the electronic device 100 comprises a touchscreen display, and a process of the method is described as follows:

Step 201: Display a folder icon on the touchscreen display, and display a drag mark in a first position of the folder icon on the touchscreen display, where the folder icon comprises icons of at least two applications.

The first position is in a boundary position of the folder icon.

Figure 3:
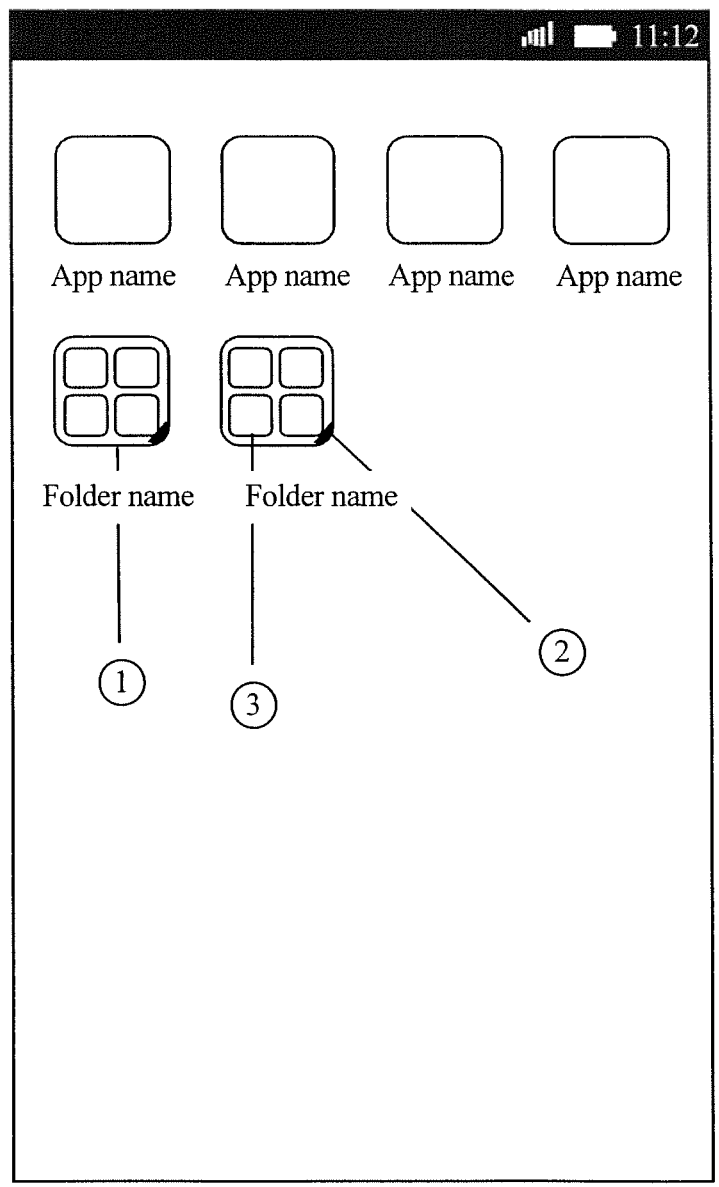
FIG. 3 is a page display diagram of a folder icon in a mobile phone terminal.

That the electronic device 100 is a mobile phone terminal is used as an example. Referring to FIG. 3, FIG. 3 is a page display diagram of a folder icon in the mobile phone terminal. A position shown in ① in FIG. 3 is an icon display area of an application (app) folder. A drag mark is set in a boundary position of a lower right corner of the folder icon, that is, a position shown in ② in FIG. 3. A position shown in ③ is an app icon displayed in a thumbnail form in the folder. The drag mark set in the position ② in FIG. 3 may be directly displayed in the folder icon or is triggered to display in a display interface of the mobile phone terminal in another interaction manner, for example, by tapping and holding or double-tapping the folder icon.

Step 202: Detect a first drag operation to the drag mark, where the first drag operation is an operation used to increase a size of an icon of an application in a folder.

Specifically, the first drag operation to the drag mark comprises an operation of dragging the drag mark, and the detecting a first drag operation to the drag mark comprises: detecting whether a drag direction indicated by the first drag operation points to an exterior of the folder icon.

Pointing to the exterior of the folder icon refers to pointing to the outside of an area in which the folder icon is located. On the contrary, pointing to an interior of the folder icon refers to pointing to the inside of an area in which the folder icon is located.

It should be noted that the first drag operation may also be set as a drag operation of another type, provided that the first drag operation is mapped into a drag action that has a function of enlarging an icon of an application in the folder.

Step 203: When the first drag operation is detected, display, on the touchscreen display, an icon that is of at least one application in the at least two applications and that is inside the folder icon, wherein the icon is enlarged for display.

Specifically, when the first drag operation is detected, and the icon that is of the at least one application in the at least two applications and that is inside the folder icon is enlarged for display, further, an icon of an application other than the at least one application in the at least two applications is not enlarged for display, but an original display size of the icon of the application is kept for display in a thumbnail form.

Further, in step 203, when an icon of any one application is enlarged for display, the folder icon is accordingly enlarged for display. Optionally, when an icon of the one application is enlarged for display, a size of the folder icon may also be kept unchanged.

Specifically, the folder icon that is enlarged for display comprises the icon, of the application, that is enlarged for display and a thumbnail icon. A size of the icon, of the application, that is enlarged for display is in a same size as the thumbnail icon, and the thumbnail icon is a set of icons, of applications, that are not enlarged for display.

Further, after the displaying, on the touchscreen display, an icon that is of at least one application in the at least two applications and that is inside the folder icon, wherein the icon is enlarged for display, the method further comprises: setting a status of the at least one application to an enabled state, and when the status of the at least one application is the enabled state and a tap operation to an icon of any one application in the at least one application is detected, loading the any one application.

It may be learned that, for an application corresponding to an icon of the application that is enlarged for display, when a user needs to enable the application, the user only needs to tap the icon of the application once to directly enable the application. A folder icon in which the application is located does not need to be additionally tapped and opened, which can save time and work, improve operation efficiency of the application, and further facilitate folder management.

Further, after the displaying, on the touchscreen display, an icon that is of at least one application in the at least two applications and that is inside the folder icon, wherein the icon is enlarged for display, the method further comprises: detecting a second drag operation to the drag mark, where the second drag operation is an operation used to reduce a size of an icon that is of an application and that is inside the folder icon; and when the second drag operation is detected, displaying, on the touchscreen display, a shrunk icon that is of an application in the at least one application and that is inside the folder icon, where a size obtained after the shrunk icon of the application is shrunk is the same as a size obtained before the shrunk icon of the application is enlarged.

Specifically, the second drag operation to the drag mark comprises an operation of dragging the drag mark, and the detecting a second drag operation to the drag mark comprises:

detecting whether a drag direction indicated by the second drag operation points to an interior of the folder icon.

It should be noted that the second drag operation may also be set as a drag operation of another type, provided that the second drag operation is mapped into a drag action that has a function of shrinking an icon of an application in the folder.

Further, after the displaying, on the touchscreen display, a shrunk icon that is of an application in the at least one application and that is inside the folder icon, the method further comprises: setting a status of the shrunk application to an disabled state, and when the status of the shrunk application is the disabled state and a tap operation to the shrunk icon of the application is detected, skipping loading any one application.

The mobile phone terminal shown in FIG. 3 is used as an example. A size and shape of the folder icon in the x-axis and the y-axis of the display interface may be changed by holding the drag mark in a lower right corner direction of the folder icon. When the shape of the folder icon is dragged to enlarge, the shape of the folder icon may match a desktop grid of a desktop system and is enlarged by the desktop grid. When the folder icon is enlarged, an icon of an app in the folder is enlarged and expanded inside the folder icon.

Figure 4:
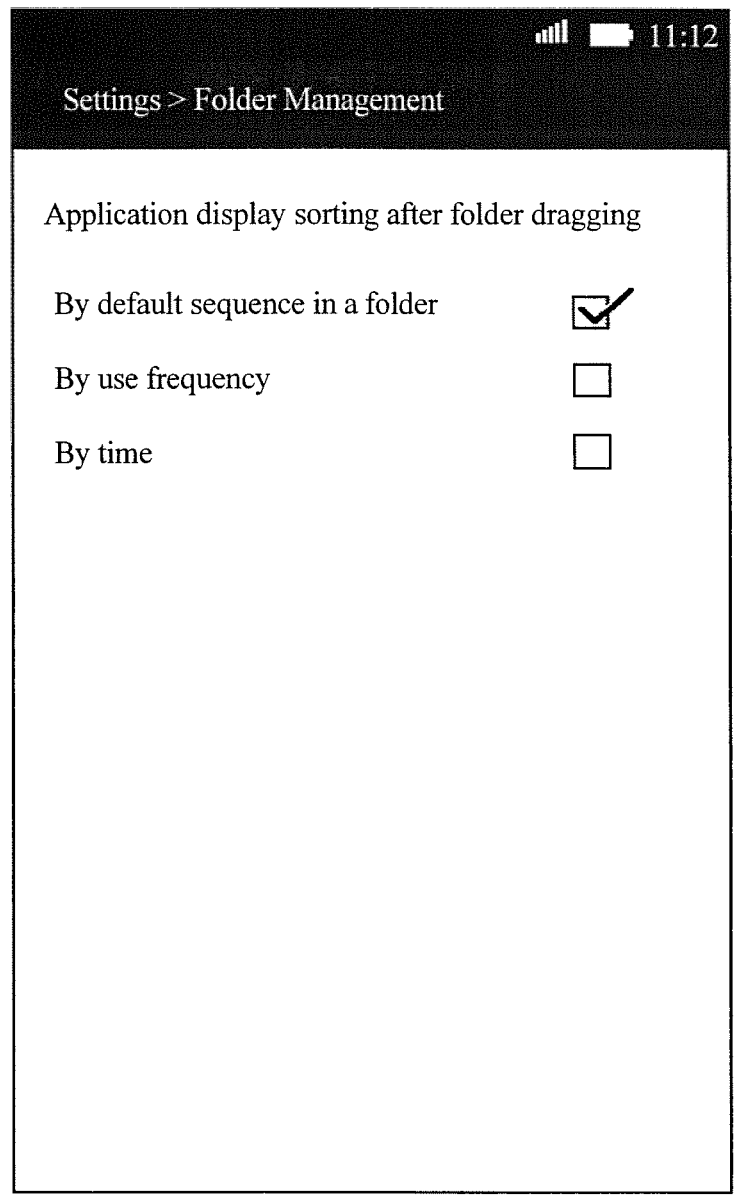
FIG. 4 is a schematic diagram of sorting management settings of an application folder in a mobile phone terminal.

In the folder, an enlargement sequence of the icon of the app may be specifically set according to a user habit. For example, in an enlargement process of the folder icon, default sorting may be performed, according to a default sorting sequence in the folder, a use frequency, or a use time sequence, on the icon of the app displayed in the folder. In addition, referring to FIG. 4, the user may also perform sorting management settings in an expanded folder. The following is described according to the default sorting sequence of apps in the folder.

According to a sorting sequence of icons of the apps in the folder, when the folder icon is enlarged and occupies one system desktop grid, an icon of an app of a corresponding sequence in the folder is enlarged and occupies space of a thumbnail icon in the original folder. The thumbnail icon in the original folder occupies space of the newly added desktop grid, and the thumbnail icon is kept in a position of the last icon in the folder.

Figure 5:
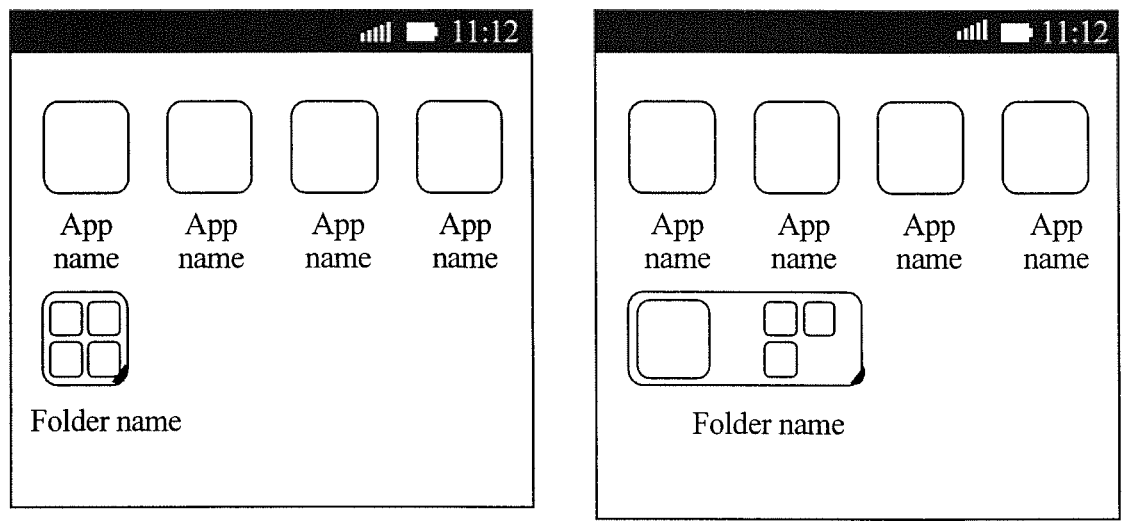
FIG. 5 is a schematic diagram obtained by enlarging a folder icon in a mobile phone terminal by one system desktop grid.
Figure 6:
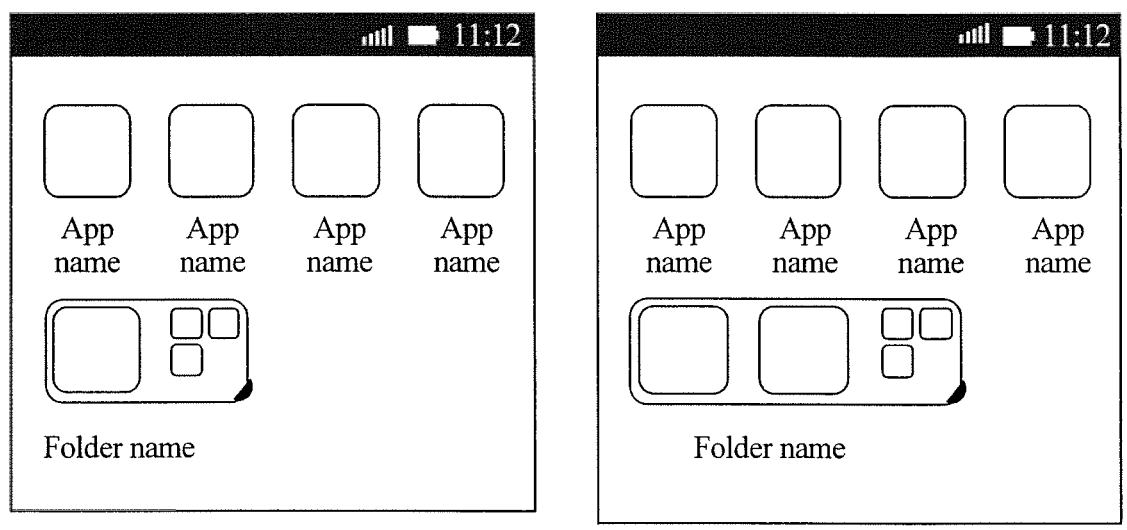
FIG. 6 is a schematic diagram obtained by continuing enlarging a folder icon in a mobile phone terminal by one system desktop grid.

As shown in FIG. 5, the folder icon is enlarged by one system desktop grid, an icon of the first application in the folder is enlarged and expanded, and occupies space of the thumbnail icon in the original folder. A thumbnail icon in the folder moves to space of the newly added grid. A smooth animation may be used for transition of the enlargement of the folder icon and the icon of the app. As shown in FIG. 6, the drag mark continues to be dragged. The folder icon is enlarged and occupies three system desktop grids, an icon of the second application in the thumbnail of the folder is enlarged and expanded, and occupies a position in which the original thumbnail is located, and the thumbnail is kept in a position of the last icon in the folder. A subsequent enlargement may be performed by analogy, until icons of all applications in the folder are expanded. After the folder icon is enlarged and all the applications are expanded, the thumbnail may disappear, or may be reserved.

Figure 7:
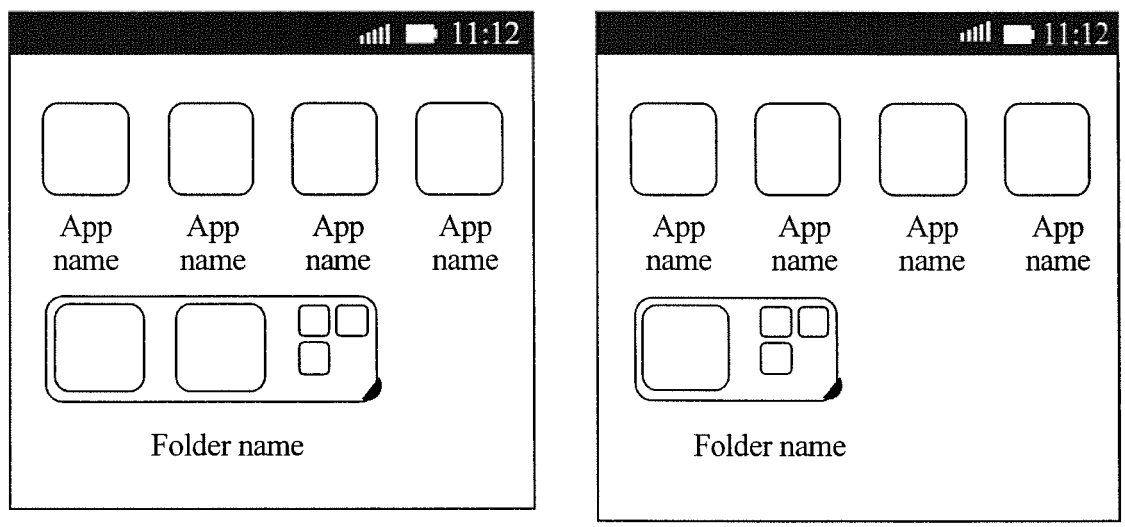
FIG. 7 is a schematic diagram obtained by shrinking a folder icon in a mobile phone terminal by one system desktop grid.

In the folder, a shrinkage law of an icon of an app is similar to an enlargement law. As shown in FIG. 7, the folder icon shrinks by one system desktop grid. An icon of an application before a thumbnail in the folder is shrunk and combined into the thumbnail, that is, the icon of the application is shrunk to an original display size, and the thumbnail occupies a position of the icon of the application. Shrinkage is continued by analogy, until icons of all applications are combined into the last thumbnail in the folder.

Figure 8:
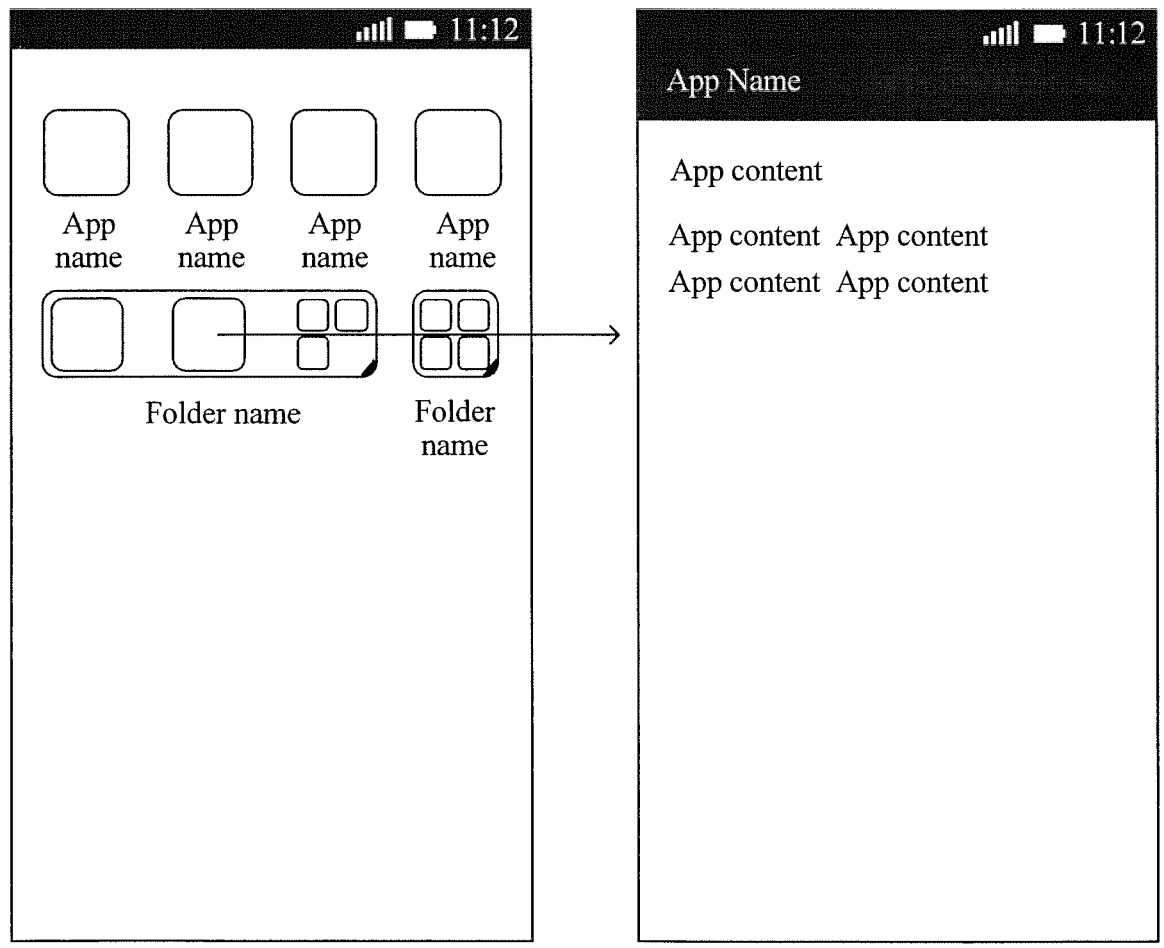
FIG. 8 is a schematic diagram of tapping an enlarged icon of an application in a terminal folder.
Figure 9:
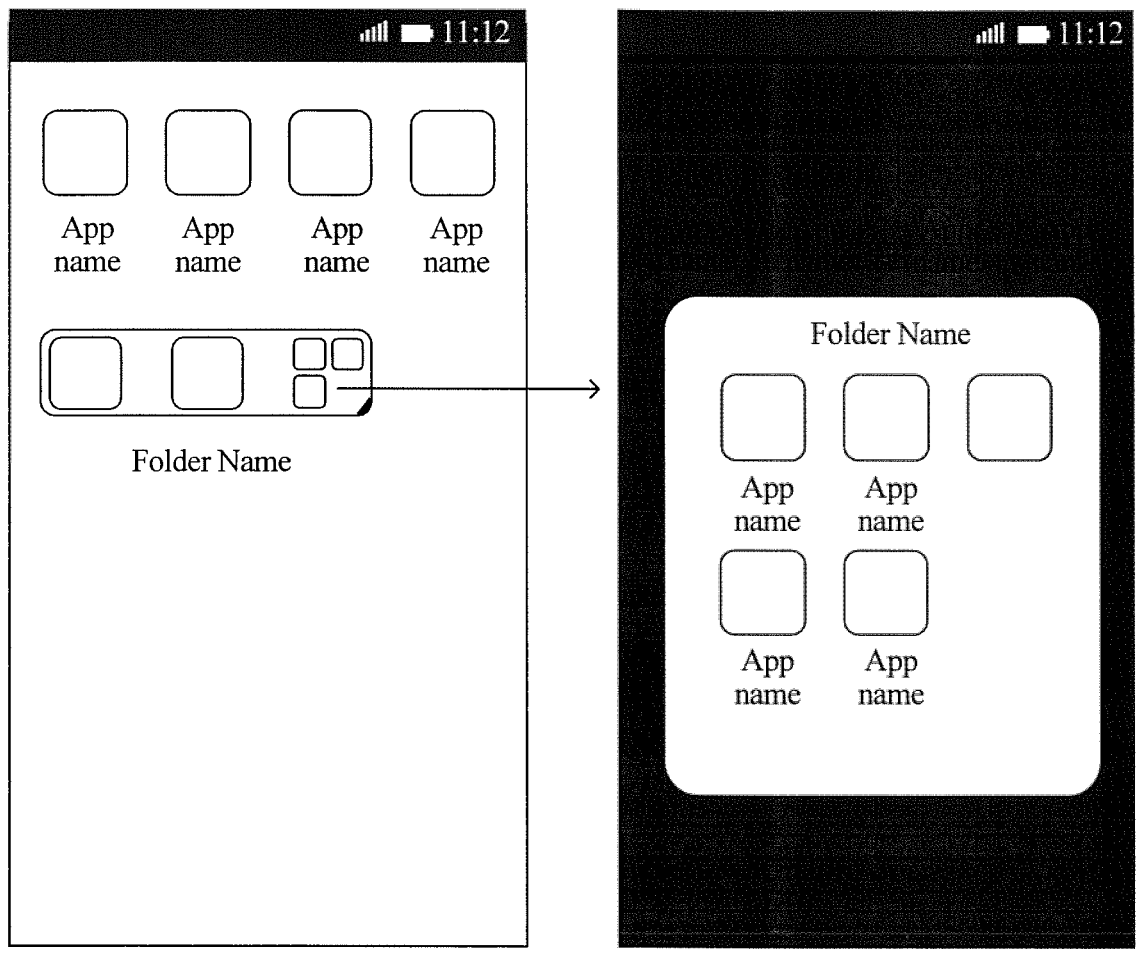
FIG. 9 is a schematic diagram of tapping a thumbnail icon in a terminal folder.

After an enlargement or shrinkage of an icon of an application is completed, the folder icon keeps a state obtained after the enlargement or the shrinkage is completed. In this case, as shown in FIG. 8, an enlarged icon of an application in the folder is tapped, and the corresponding application is directly enabled. As shown in FIG. 9, a thumbnail icon in the folder is tapped, and the icons of all the applications in the folder are expanded.

Figure 10:
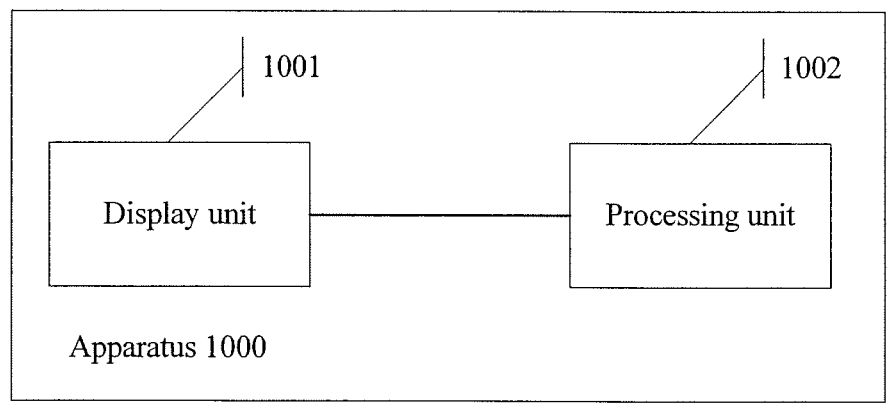
FIG. 10 is a schematic structural diagram of a folder management apparatus according to an embodiment of the present invention.

Based on the folder management method provided in the foregoing embodiment, referring to FIG. 10, an embodiment of the present invention provides a folder management apparatus 1000. The apparatus 1000 may be configured to execute the method in the foregoing FIG. 2 to FIG. 7. The apparatus 1000 is applied to an electronic device that has a touchscreen display, and the electronic device may be an electronic device 100 shown in FIG. 1. FIG. 10 is a schematic structural diagram of the apparatus 1000 provided in this embodiment of the present invention. As shown in FIG. 10, the apparatus 1000 comprises a display unit 1001 and a processing unit 1002.

The display unit 1001 is configured to display a folder icon on the touchscreen display, and display a drag mark in a first position of the folder icon on the touchscreen display, where the folder icon comprises icons of at least two applications.

The processing unit 1002 is configured to detect a first drag operation to the drag mark, where the first drag operation is used to increase a size of an icon of an application in a folder; and when the first drag operation is detected, display, on the touchscreen display, an icon that is of at least one application in the at least two applications and that is inside the folder icon, wherein the icon is enlarged for display.

Optionally, the first drag operation to the drag mark comprises an operation of dragging the drag mark, and when detecting the first drag operation to the drag mark, the processing unit 1002 is configured to:

detect whether a drag direction indicated by the first drag operation points to an exterior of the folder icon.

Optionally, the first position is in a boundary position of the folder icon.

Optionally, the processing unit 1002 is further configured to:

when the first drag operation is detected, display, on the touchscreen display, an icon of an application other than the at least one application in the at least two applications, where the icon is not enlarged for display.

Optionally, after the icon that is of at least one application in the at least two applications and that is inside the folder icon is enlarged on the touchscreen display, wherein the icon is enlarged for display, the processing unit 1002 is further configured to:

set a status of the at least one application to an enabled state, and when the status of the at least one application is the enabled state and a tap operation to an icon of any one application in the at least one application is detected, load the any one application.

Optionally, after the icon that is of at least one application in the at least two applications and that is inside the folder icon is enlarged on the touchscreen display, wherein the icon is enlarged for display, the processing unit 1002 is further configured to:

detect a second drag operation to the drag mark, where the second drag operation is an operation used to reduce a size of an icon that is of an application and that is inside the folder icon; and when the second drag operation is detected, display, on the touchscreen display, a shrunk icon that is of an application in the at least one application and that is inside the folder icon, where a size obtained after the shrunk icon of the application is shrunk is the same as a size obtained before the shrunk icon of the application is enlarged.

Optionally, after the shrunk icon that is of the application in the at least one application and that is inside the folder icon is shrunk on the touchscreen display, the processing unit 1002 is further configured to:

set a status of the shrunk application to an disabled state, and when the status of the shrunk application is the disabled state and a tap operation to the shrunk icon of the application is detected, skip loading any one application.

Optionally, when the second drag operation to the drag mark comprises an operation of dragging the drag mark, and when detecting the second drag operation to the drag mark, the processing unit 1002 is configured to:

detect whether a drag direction indicated by the second drag operation points to an interior of the folder icon.

Optionally, the processing unit 1002 is further configured to:

when an icon of any one application is enlarged for display, accordingly enlarge the folder icon on the touchscreen display for display.

Optionally, the processing unit 1002 is further configured to:

when an icon of any one application is enlarged for display, keep a size of the folder icon unchanged on the touchscreen display.

The foregoing apparatus 1000 involved in this embodiment of the present invention may be an independent part, and may also be integrated into another part.

It should be noted that, for a function implementation and an interaction manner of each unit of the apparatus 1000 in this embodiment of the present invention, reference may further be made to description of the related method embodiment, and details are not described herein.

In conclusion, according to this embodiment of the present invention, an electronic device that has a touchscreen display displays a folder icon on the touchscreen display, and displays a drag mark in a first position of the folder icon; detects a first drag operation to the drag mark, where the first drag operation is used to increase a size of an icon of an application in a folder; and when the first drag operation is detected, displays, on the touchscreen display, an icon that is of at least one application in the at least two applications and that is inside the folder icon, wherein the icon is enlarged for display. In this way, icons that are of some applications and that are in the folder icon can be enlarged for display. For an application corresponding to an icon of the application enlarged for display, when a user needs to enable this application, the user only needs to directly tap the icon of the application displayed inside the folder icon, which facilitates management of applications in the folder.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-executable storage media (including but not limited to a disk memory, a CD-ROM, an optical memory, and the like) that comprise computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that comprises an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A folder management method, wherein the method is executed by an electronic device that has a touchscreen display, and the method comprises:

displaying a folder icon on the touchscreen display, and displaying a drag mark in a first position of the folder icon on the touchscreen display, wherein the folder icon comprises icons of at least two applications, including a first icon associated with a first application of the at least two applications, and the icons of the at least two applications are displayed in the folder icon in a shrunk size as a thumbnail icon;

detecting a first drag operation to the drag mark, wherein the first drag operation is used to increase a size of an icon of at least one application inside the folder icon from a shrunk size to an enlarged size; and when the first drag operation is detected, displaying the first icon in the enlarged size inside the folder icon and adjacent to the thumbnail icon without the first icon on the touchscreen display, wherein the enlarged size of the first icon is a same size as the thumbnail icon.

2. The method according to claim 1, wherein the first drag operation to the drag mark comprises an operation of dragging the drag mark, and the detecting a first drag operation to the drag mark comprises:

detecting whether a drag direction indicated by the first drag operation points to an exterior of the folder icon.

3. The method according to claim 1, wherein the first position is in a boundary position of the folder icon.

4. The method according to claim 1, wherein the method further comprises:

when the first drag operation is detected, displaying, in the folder icon and in the shrunk size, an icon of an application other than the first application.

5. The method according to claim 1, wherein after the displaying the first icon in the enlarged size and inside the folder icon on the touchscreen display, the method further comprises:

setting a status of the first application to an enabled state, and when the status of the first application is the enabled state and a tap operation to the first icon is detected, loading the first application.

6. The method according to claim 1, wherein after the displaying the first icon in the enlarged size and inside the folder icon on the touchscreen display, the method further comprises:

detecting a second drag operation to the drag mark, wherein the second drag operation is an operation used to reduce a size of an icon that is of an application and that is inside the folder icon from the enlarged size to the shrunk size; and when the second drag operation is detected, displaying the first icon in the shrunk size and inside the folder icon on the touchscreen display.

7. The method according to claim 6, wherein after the displaying the first icon in the shrunk size and inside the folder icon on the touchscreen display, the method further comprises:

setting a status of the first application to a disabled state, and when the status of the first application is the disabled state and a tap operation to the first icon is detected, skipping loading the first application.

8. The method according to claim 6, wherein the second drag operation to the drag mark comprises an operation of dragging the drag mark, and the detecting a second drag operation to the drag mark comprises:

detecting whether a drag direction indicated by the second drag operation points to an interior of the folder icon.

9. The method according to claim 1, wherein the method further comprises:

when an icon of any one application is enlarged for display, the folder icon is accordingly enlarged for display.

10. The method according to claim 1, wherein the method further comprises:

when an icon of any one application is enlarged for display, a size of the folder icon is unchanged.

11. A folder management device, wherein the device comprises a touchscreen display, a processor, and a non-transitory memory, wherein:

the touchscreen display is configured to display a folder icon, and display a drag mark in a first position of the folder icon, wherein the folder icon comprises icons of at least two applications, including a first icon associated with a first application of the at least two applications, and the icons of the at least two applications are displayed in the folder icon in a shrunk size as a thumbnail icon; and the processor is configured to read computer-executable code in the non-transitory memory, so as to execute the computer-executable code to: detect a first drag operation to the drag mark, wherein the first drag operation is used to increase a size of an icon of at least one application inside the folder icon from a shrunk size to an enlarged size; and when the first drag operation is detected, display the first icon in the enlarged size inside the folder icon and adjacent to the thumbnail icon without the first icon on the touchscreen display, wherein the enlarged size of the first icon is a same size as the thumbnail icon.

12. The device according to claim 11, wherein the first drag operation to the drag mark comprises an operation of dragging the drag mark, and when detecting the first drag operation to the drag mark, the processor is configured to:

detect whether a drag direction indicated by the first drag operation points to an exterior of the folder icon.

13. The device according to claim 11, wherein the first position is in a boundary position of the folder icon.

14. The device according to claim 11, wherein the processor is further configured to:

when the first drag operation is detected, display, in the shrunk size and in the folder icon on the touchscreen display, an icon of an application other than the first application.

15. The device according to claim 11, wherein after the first icon is displayed by the touchscreen display in the enlarged size, the processor is further configured to: set a status of the first application to an enabled state, and when the status of the first application is the enabled state and a tap operation to the first icon is detected, load the first application.

16. The device according to claim 11, wherein after the first icon is displayed by the touchscreen display in the enlarged size, the processor is further configured to: detect a second drag operation to the drag mark, wherein the second drag operation is an operation used to reduce a size of an icon that is of an application and that is inside the folder icon from the enlarged size to the shrunk size; and when the second drag operation is detected, display the first icon in the shrunk size and in the folder icon on the touchscreen display.

17. The device according to claim 16, wherein after the first icon is displayed in the shrunk size and in the folder icon on the on the touchscreen display, the processor is further configured to:

set a status of the first application to a disabled state, and when the status of the first application is the disabled state and a tap operation to the first icon is detected, skip loading the first application.

18. The device according to claim 16, wherein when the second drag operation to the drag mark comprises an operation of dragging the drag mark, and when detecting the second drag operation to the drag mark, the processor is configured to:

detect whether a drag direction indicated by the second drag operation points to an interior of the folder icon.

19. The device according to claim 11, wherein the processor is further configured to:

when an icon of any one application is enlarged for display, the folder icon is accordingly enlarged on the touchscreen display for display.

20. The device according to claim 11, wherein the processor is further configured to:

when an icon of any one application is enlarged for display, a size of the folder icon is unchanged on the touchscreen display.

* * * * *